United States Patent
Paschel et al.

(10) Patent No.: US 9,961,544 B2
(45) Date of Patent: May 1, 2018

(54) PERSONALIZED MEDIA DELIVERY

(71) Applicant: Skullcandy, Inc., Park City, UT (US)

(72) Inventors: Samuel Paschel, Park City, UT (US);
Samuel Steele Noertker, Park City, UT (US); Thomas Bishop, Park City, UT (US); Thomas Burton, Midway, UT (US); Matthew Windt, Heber City, UT (US)

(73) Assignee: Skullcandy, Inc., Park City, UT (US)

( * ) Notice: Subject to any disclaimer, the term of this patent is extended or adjusted under 35 U.S.C. 154(b) by 0 days. days.

(21) Appl. No.: 14/721,434

(22) Filed: May 26, 2015

(65) Prior Publication Data
US 2016/0353278 A1    Dec. 1, 2016

(51) Int. Cl.
*H04W 12/06* (2009.01)
*H04L 29/08* (2006.01)
*H04W 4/02* (2018.01)
*H04W 4/20* (2018.01)

(52) U.S. Cl.
CPC ........... *H04W 12/06* (2013.01); *H04L 67/306* (2013.01); *H04W 4/025* (2013.01); *H04W 4/206* (2013.01)

(58) Field of Classification Search
CPC .............................. H04W 12/06; H04L 67/306
USPC ............. 455/26.1, 410, 411, 435.1, 558; 380/5.81, 247, 248, 249, 250, 270
See application file for complete search history.

(56) References Cited

U.S. PATENT DOCUMENTS

| | | | |
|---|---|---|---|
| 2008/0152305 A1* | 6/2008 | Ziegler | H04N 5/775 386/291 |
| 2009/0182913 A1* | 7/2009 | Rosenblatt | H04M 1/05 710/72 |
| 2012/0222092 A1 | 8/2012 | Rabii | |
| 2013/0232350 A1 | 9/2013 | Belesiu et al. | |
| 2014/0359124 A1* | 12/2014 | Adimatyam | H04N 21/44222 709/225 |
| 2015/0058229 A1* | 2/2015 | Wiacek | G06F 21/10 705/310 |
| 2015/0079900 A1 | 3/2015 | Rosener | |
| 2015/0082049 A1 | 3/2015 | Rubinstein et al. | |
| 2016/0309054 A1* | 10/2016 | Palumbo | H04N 1/32454 |
| 2017/0041986 A1* | 2/2017 | Sela | H04L 12/66 |

OTHER PUBLICATIONS

International Search Report for International Application No. PCT/US2016/034035 dated Oct. 24, 2016, 5 pages.
International Written Opinion for International Application No. PCT/US2016/034035 dated Oct. 24, 2016, 5 pages.

* cited by examiner

*Primary Examiner* — Inder Mehra
(74) *Attorney, Agent, or Firm* — TraskBritt (57) ABSTRACT

The disclosure includes a system including media assets and an access system. The media assets include standard media and restricted media. The restricted media is different from the standard media. The access system receives an accessory identifier from a client device communicatively coupled to an accessory associated with the accessory identifier. The access system further authorizes access for the client device to the restricted media based at least in part on the accessory identifier. The standard media is accessible to the client device regardless of the access system receiving the accessory identifier. The restricted media is not accessible to the client device when the access system has not received the accessory identifier.

18 Claims, 7 Drawing Sheets

PERSONALIZED MEDIA DELIVERY

BACKGROUND

The specification relates to personalized media delivery.

Media streaming services are becoming increasingly popular. Various types of media may be streamed. For example, music may be streamed wirelessly. Some music streaming services may allow a user to specify which songs to play. Other music streaming services may generate a playlist, for example based on a particular user's music profile, or may offer playlists created by other users that the user may select for playback.

SUMMARY

The subject matter described in this disclosure may include a system for authorizing access to restricted media. The system may include a tangible storing media that stores media assets and an access system. The media assets may include standard media and restricted media. The restricted media may be different from the standard media. The access system may be configured to receive an accessory identifier including a description of an accessory communicatively coupled to a client device. The access system may include instructions that, responsive to being executed by a processor, analyze the accessory identifier to determine if the client device is authorized to access the restricted media and authorize the client device to access the restricted media based at least in part on the accessory identifier indicating that the accessory communicatively coupled to the client device includes a selected accessory. The standard media may be accessible to the client device regardless of the access system receiving the accessory identifier. The restricted media may not be accessible to the client device without authorization by the access system.

The accessory may be a pair of headphones and the accessory identifier may be associated with the pair of headphones. The accessory may be a speaker and the accessory identifier may be associated with the speaker. The restricted media may include a restricted song not included in the standard media. The restricted song is associated with the accessory. The restricted song may be a different version of a standard song included in the standard media. For example, the accessory may include a particular brand, make or model of headphones, and the accessory identifier may indicate that the client device is communicatively coupled to these particular headphones. The access system may determine that the client device may access the restricted media because the accessory identifier indicates that the client device is communicatively coupled to these particular headphones. In this way, the restricted media content may incentivize the purchase of particular brands, makes or models of headphones.

The system may include an audio reproduction device, a music player, and a gatherer. The audio reproduction device may be configured to deliver audio to a user. For example, the audio reproduction device may include headphones. The audio reproduction device may include a microphone for receiving the audio delivered to the user. The microphone may be used to capture the audio delivered to the user that may be used to confirm or deny the beats per minute associated with the audio delivered to the user. The system may further include a sensor for sensing the status of the user. The audio reproduction device may include the sensor. The music player may play songs for the user by way of the audio reproduction device.

The gatherer may be configured to gather music consumption context data including a song identifier and a status identifier, and send the song identifier and the status identifier to a media consumption context database. The status identifier may include a physiological status or a change in the physiological status of the user, an environmental status of the user, or an activity status of the user.

A report system may analyze the music consumption context data and determine report data describing a music context report. The music context report may describe how one or more different users consume different tracks of music. For example, for a given track, the music context report may describe the context for how the track is consumed. The context may describe one or more of the following: an activity engaged in by the user when consuming the track; the environment the user was located in when consuming the track (e.g., time of day, day of week, season of year, user located outside, user located inside, user located at a particular location outside, user located at a particular location inside, etc.); a biological state of the user when consuming the track (e.g., heart rate, activity level, perspiration state, etc.); a psychological status of the user when consuming the track; playlist data describing one or more songs played before the track or one or more songs played after the track; and the buying habits of the users who played the track. In this way, the music context report may provide various data describing how the music is consumed or perceived in the marketplace.

The music context report may be provided to an artist who recorded the track, a user associated with the artist (e.g., the artist's manager) or the record label that distributed the track so that these entities may modify the track or other tracks of the artist based on a desired result in the marketplace. In this way, the report system may provide a service to artists so that they may increase their success or desired results in the marketplace.

In some embodiments, a system may include an electronic device that includes a processor, an exercise tracker, and a song manager. The system may also include an audio reproduction device and a music player.

The exercise tracker may be stored on a tangible memory. The exercise tracker may analyze an exercise routine of the user and may identify at least one drag portion of the exercise routine. The drag portion of the exercise routine may be associated with a portion of the exercise routine likely to demand a prolonged period of exertion from the user. The exercise tracker may identify the drag portion based on an elevation change associated with a route of the exercise routine. For example, if the user is jogging, the drag portion may identify a portion of the exercise routine where the user is jogging uphill.

The song manager may be stored on a tangible memory. The song manager may instruct the music player to play a power song associated with the user such that the power song is played for the user for at least a portion of a time the user spends in the drag portion of the exercise routine. The power song may have been previously correlated with an increase in user effort. For example, the system may have analyzed the past performance of the user and determined that when certain songs are played, the user tends to exert greater effort. The system may identify these songs as "power songs" and proactively play these power songs for the user when the exercise routine is determined to correspond to a need for greater effort.

The exercise tracker may further analyze a performance metric of the user and identify the at least one drag portion of the exercise routine based at least in part on the performance metric of the user. For example, the performance metric may include a target heart rate range for the user to maximize potential to burn calories and the exercise tracker may identify the drag portion of the exercise routine based on the heart rate falling outside the target heart rate range.

The song manager may further analyze a performance metric of the user while the power song is playing to determine whether to declassify the power song as one of the power songs associated with the user. For example, the song manager may determine that the user no longer exerts greater effort when the song is played. In another example, the song may have decreased in popularity among multiple users, thereby indicating that the song should be declassified as a power song.

The song manager may determine a power song by instructing the music player to play a test song for the user. The song manager may select the test song based at least in part on similarities to one or more power songs associated with the user. The song manager may further analyze a performance metric of the user while the test song is playing to determine whether to classify the test song as one of the power songs associated with the user.

The exercise tracker may identify at least one glide portion of the exercise routine. The glide portion of the exercise routine may be associated with a portion of the exercise routine that is likely to demand a prolonged period of decreased exertion from the user. For example, the glide portion may correspond to a portion of the exercise routine where the user runs downhill or on a relatively level surface. The song manager may further instruct the music player to play a glide song such that the glide song is played for the user for at least a portion of a time the user spends in the glide portion of the exercise routine.

The song manager may be configured to play a seed song, determine a reaction from the user to the seed song, and responsive to the reaction corresponding to the increased exertion from the user, identify similar songs and classify the seed song and the similar songs as power songs. For example, the seed song may have a certain tempo that the user enjoys. The user may enjoy other songs with a similar tempo. Classifying these songs as power songs may result in a better exercise experience for the user.

The song manager may be configured to classify a new song as a power song by identifying a number of beats per minute associated with the new song, determining target steps per minute for the user during the drag portion of the exercise routine, and classifying the new song as the power song responsive to the beats per minute substantially corresponding to the target steps per minute. For example, where the exercise is running, the user may run faster if the user is listening to a power song with 165 beats per minute where the 165 beats per minute correspond to the user's target steps of 100 steps per minute (to achieve a pace of six miles per hour).

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

A user may have access to large amounts of music through numerous avenues. One avenue for accessing music may include a streaming service. Each streaming service generally offers similar features and a similar library of available music. Furthermore, the available music is typically the same for each subscriber of the streaming service.

For the music industry that supplies the music to the streaming services, the value provided by the streaming services may not extend much beyond the royalty payments paid for the song played. The subject matter described in this disclosure may, in some instances, add features and/or value to a streaming service.

In some embodiments, special media, such as particular songs, may be available only to users having a selected accessory, such as a particular type of headphones, a speaker, or the like. For example, access to special versions of songs may be allowed based on the presence of headphones and/or speakers having a particular brand, make, or model. The special versions of songs may include versions of songs not available to the general public. For example, the special versions of the songs may include artists' cuts, remixes, demos, mashups, acoustic versions, and/or live recordings of songs available to the general public. Some of the special versions of the songs may be associated with a particular model of headphones. For example, if a user connects "model A" headphones to a smartphone or other music player, the user may receive access to a "model A" version of a song not otherwise available to the user.

The special versions of the songs may be associated with a type of headphones. For example, earbud-style headphones may allow access to relatively higher-tempo versions of songs and over-the-ear style headphones may allow access to relatively bass-heavy versions of songs. Alternatively or additionally, the special versions of the songs may be associated with a style of headphones. For example, the headphones may be associated with a particular artist and may allow access to special versions of songs associated with the artist. Alternatively or additionally, the headphones may be associated with a particular style of music and may allow access to special versions of songs associated with the particular style of music. Thus, for example, a music service that partners with the music industry and/or an accessory seller may add value to its service relative to other services.

In some embodiments, the special version of the song may include a different audio profile (e.g., modified equalization versus the standard version of the song otherwise available in other outlets), binaural recording, object based audio recording or any other recording that may be modified or selected via an application running on a client such as a smartphone.

In some embodiments, the music service may alternately or additionally add value to its service through the generation and storage of rich data detailing the context in which songs are consumed by users. Thus, for example, the music service may provide consumption context data to the music industry. The music industry may, in term, use the consumption context data to steer production of new music, marketing efforts, or the like.

In some embodiments, a system may alternately or additionally use songs to motivate a user to push through difficult portions of a workout routine (or any other routine, including routines that are not exercise or workout related). Songs that have been observed to particularly motivate the user may be played during the difficult portions of the exercise routine. In a manner, the system may be used to give the user a second wind to push through the difficult portions of the exercise routine. The songs that motivate the user may be described as power songs. Whether a song qualifies as a power song may be recorded as part of the music consumption context data. Thus, for example, an artist may be given some measure of which songs are making a relatively strong impact on listeners.

The system may alternately or additionally test additional songs to find new power songs for the user. Alternately or additionally, glide songs may be played during relatively easy portions of the workout routine to condition the user to experience a motivational boost when the song is played. Alternately or additionally, seed songs may be played to determine a reaction from the user and then categorized as a power song if the user increases exertion. The test songs and/or the seed songs may be selected based on similarities to current power songs, popularity, song tempo, or the like. The effectiveness of the power songs may be monitored. For example, biometric data such as the user's heart rate, step counts, acceleration or other metrics may be monitored by one or more sensors of the user's smartphone or wearable device (e.g., smartwatch, fitness monitoring device, pedometer, etc.) and changes in this biometric data may be used to determine whether a song is effective as a power song. As the user's musical tastes change, the user may grow tired of the power songs and/or the power songs may lose their motivational effect. To compensate, the catalog of power songs for a user may be regularly updated.

Figure 1:
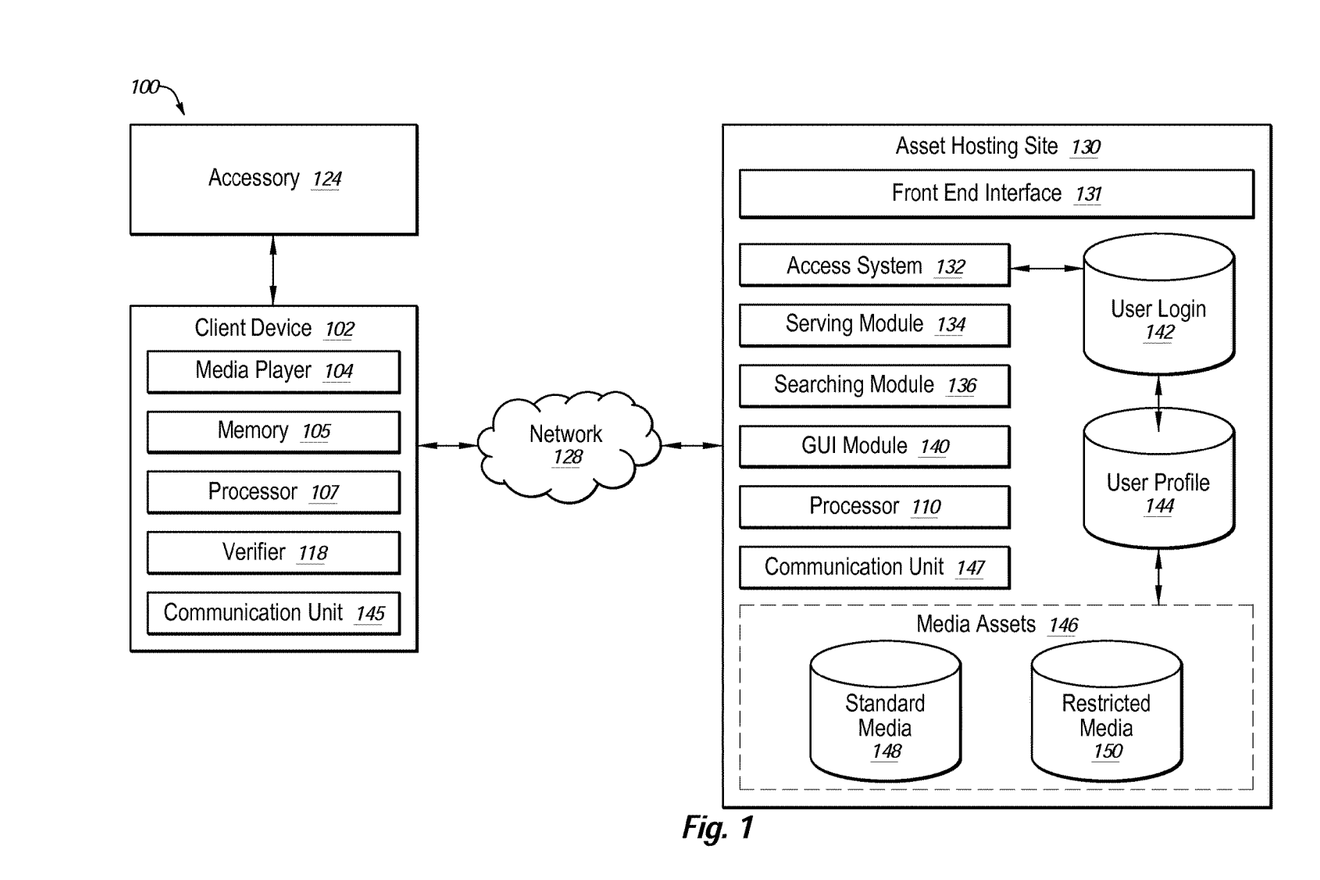
FIG. 1 is a diagram of an example system for allowing distribution of restricted media to users based on the presence of a selected accessory.

FIG. 1 is a diagram of an example system 100 for allowing distribution of restricted media to users based on the presence of a particular accessory. The system 100 may include a client device 102. The client device 102 may be configured to play music via a media player 104. The media player 104 may include a music streaming application and/or a video streaming application for playing music and/or videos via a network 128, such as the internet. Alternately or additionally, the media player 104 may include a native music and/or video player for playing music and/or videos stored on the client device 102. The client device 102 may include a mobile phone, a portable media player, an audio player, a desktop computer, a laptop computer, a tablet computer, smartwatch, network-connected fitness tracker, Internet of Things device, or the like.

The client device 102 may include a memory 105 and a processor 107. The memory 105 may include non-transitory computer-readable media. Instructions such as programming code executable by the processor 107 may be encoded in the memory 105. The programming code may include low level programming code, such as an assembly language, or a high level programming code, such as PYTHON®. When the instructions are executed by the processor 107, the client device 102 may perform operations related to and/or including the processes described in this disclosure.

The processor 107 includes an arithmetic logic unit, a microprocessor, a general-purpose controller, or some other processor array to perform computations and provide electronic display signals to a display device. The processor 107 processes data signals and may include various computing architectures including a complex instruction set computer (CISC) architecture, a reduced instruction set computer (RISC) architecture, or an architecture implementing a combination of instruction sets. Although the client device 102 includes a single processor 107, multiple processors 107 may be included. The processor 107 may include a graphical processing unit. Other processors, operating systems, sensors, displays, and physical configurations may be possible.

The memory 105 is a tangible storage medium that stores instructions or data that may be executed by the processor 107. The instructions or data may include code for performing the techniques described herein. The memory 105 may include a dynamic random access memory (DRAM) device, a static random access memory (SRAM) device, flash memory, or some other memory device. In some implementations, the memory 105 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the client device 102 may communicate with an asset hosting site 130 via a network 128. For example, the client device 102 may communicate with the network 128 via the communication unit 145.

The communication unit 145 may include hardware that transmits and receives data to and from the network 128. In some embodiments, the communication unit 145 includes a port for direct physical connection to the network 128 or to another communication channel. For example, the communication unit 145 includes a USB, SD, CAT-5, or similar port for wired communication with the network 128. In some embodiments, the communication unit 145 includes a wireless transceiver for exchanging data with the network 128 or other communication channels using one or more wireless communication methods, including IEEE 802.11, IEEE 802.16, Bluetooth®, Bluetooth Low Energy (Bluetooth LE) or another suitable wireless communication method.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 128 for distribution of files or media objects using standard network protocols including TCP/IP, HTTP, HTTPS, and SMTP, etc.

In some embodiments, the communication unit 145 enables the client device 102 to communicate with the accessory 124 via a wired or wireless communicative coupling. For example, the communication unit 145 enables the client device 102 to stream media to the accessory 124 via a Bluetooth connection.

The network 128 can be a conventional type, wired or wireless, and may have numerous different configurations including a star configuration, token ring configuration, or other configurations. Furthermore, the network 128 may include a local area network (LAN), a wide area network (WAN) (e.g., the Internet), or other interconnected data paths across which multiple devices may communicate. In some embodiments, the network 128 may be a peer-to-peer network. The network 128 may also be coupled to or include portions of a telecommunications network for sending data in a variety of different communication protocols. In some embodiments, the network 128 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some embodiments, the network 128 may include a global positioning system (GPS) satellite for providing GPS navigation or GPS coordinates to the client device 102. In some embodiments, the network 128 may include a GPS satellite for providing GPS functionality to the client device 102. The network 128 may be a mobile data network such as 3G, 4G, LTE, Voice-over-LTE ("VoLTE"), or any other mobile data network or combination of mobile data networks.

The asset hosting site 130 may include a system for allowing the user to access media assets 146 via the network 128. For example, the asset hosting site 130 may enable a user to stream media assets 146 via the client device 102 which is communicatively coupled to the network 128. The asset hosting site 130 may include a processor 110 and a communication unit 147. The functionality of the processor 110 and the communication unit 147 generally correspond to the functionality of the processor 107 and the communication unit 145 described above with reference to the client device 102, and so, those descriptions will not be repeated here. The asset hosting site 130 may also include a memory corresponding to the memory 105 described above with reference to the client device 102. For example, the media assets 146 may be stored in a tangible memory that is communicatively coupled to the processor 110.

In some embodiments, the asset hosting site 130 may include a hardware server configured to provide a media streaming service to one or more client devises 102 communicatively coupled to the network 128.

The asset hosting site 130 may include a front end interface 131 for communicating with the client device 102 via the network 128. For example, the front end interface 131 may receive requests for media from the client device 102. Alternately or additionally, the asset hosting site 130 may include a serving module 134 for processing requests for media assets 146 and for providing the requested media assets 146 to the client device 102. Alternately or additionally, the asset hosting site 130 may include a search module 136 for processing media asset search queries from the client device 102 and returning the media asset search results to the client device 102.

In some embodiments, the asset hosting site 130 may include a graphic user interface (GUI) module 140 for providing graphical data for generating a GUI for use by a user of the client device 102. The GUI module 140 may provide album art (or any other art or graphical content) associated with a song media asset or the like to the client device 102.

In some embodiments, the asset hosting site 130 may include a user login database 142 for storing user login information. The user login database 142 may receive information from the access system 132 regarding the presence of the accessory 124. Upon successfully logging in to the asset hosting site 130, the client device 102 may be allowed access to the standard media from the standard media database 148. The client device 102 may be allowed access to some or all of the restricted media from the restricted media database 150 in response to the access system 132 indicating the presence of the accessory 124 (or a particular accessory 124) being communicatively coupled to the client device 102. In some embodiments, the login information may be included in authentication data transmitted by the client device 102 to the asset hosting site 130 via the network 128. The authentication data may include a user name, password and accessory identifier associated with the client device 102.

In some embodiments, the asset hosting site 130 may include a user profile database 144 for storing data and/or information associated with the user. For example, the user profile database 144 may store user names, passwords and user preferences for one or more users. The user profile database 144 may also store data describing different accessory identifiers and which restricted media 150 are associated with these different accessory identifiers. In this way, the access system 132 may (1) analyze the authentication data to authenticate the user based on the user name and password provided in the authentication data, (2) determine whether the client device 102 may access restricted media 150 based on the accessory identifier and (3) determine which tracks or portions of restricted media the client device 102 may access. The front end interface 131 may then stream the restricted media associated with the accessory identifier to the client device 102.

In some embodiments, the client device 102 may be communicatively coupled to, or otherwise associated with, an accessory 124. The accessory 124 may include headphones, speakers, a vehicle infotainment system, and/or other devices that may be communicatively coupled, or otherwise associated with, the client device 102. The accessory 124 may be communicatively coupled to, or otherwise associated with, the client device 102 via a wired connection, such as an audio jack connection, a computer bus connection (e.g., USB, LIGHTNING® connector or any derivative thereof), or the like or any combination thereof. Alternately or additionally, the accessory 124 may be communicatively coupled to, or otherwise associated with, the client device 102 via a wireless connection, such as a wireless personal area network (WPAN) (e.g., BLUETOOTH®, Bluetooth LE, or any derivative thereof), a wireless local area network (WLAN) or the like or any combination thereof. The client device 102 may deliver audio and/or video signals to the accessory 124 via the wired and/or wireless connections.

In some embodiments, the accessory 124 may identify itself to the client device 102. The accessory 124 may identify its brand, make, model, serial number, or the like or any combination thereof to the client device 102. In some embodiments, the accessory 124 may inform the client device 102 of its identity over a wired and/or wireless connection to the client device 102. For example, the accessory 124 may inform the client device 102 of its identity via a microphone input of the audio jack, via the computer bus connection, via the WPAN, via the WLAN, or the like or any combination thereof.

In some embodiments, the accessory 124 may be associated with a hardware device configured to couple to the computer bus and to identify the accessory 124 to the client device 102. For example, the accessory 124 may be associated with a dongle device that the user may insert into the computer bus connector of the client device 102 to communicate the identity of the accessory 124 to the client device 102. By way of example, an additional hardware device may be used to identify a set of headphones configured to communicatively couple to the client device 102 by way of an audio jack connection. Thus, for example, the additional hardware may allow the client device 102 to identify the headphones without introducing additional circuitry to the headphones for providing its identity to the client device 102 via the audio jack connection.

Alternately or additionally, the identity of the accessory 124 may be input into the client device 102 in another manner. In some embodiments, a code, a serial number, and/or another identifier may be entered into the client device 102. For example, the code, the serial number, and/or the other identifier may be manually entered into the client device 102 by a user. Alternately or additionally, the code, the serial number, and/or the other identifier may be entered into the client device 102 by way of a camera of the client device 102. For example, the code, the serial number, and/or the other identifier may be included in a barcode or other machine-readable visual representation of data that may be scanned by the camera of the client device 102. Such a barcode may be located on the accessory 124 such that it may be scanned by the camera while the accessory 124 is communicatively coupled to the client device 102. Alternately or additionally, the code, the serial number, and/or the other identifier may be communicated to the client device 102 by way of near field communication (NFC). For example, the accessory 124 may include an NFC tag that may be read by an NFC reader of the client device 102. In some embodiments, the client device 102 may store the identity of the accessory 124 until the accessory 124 is disconnected from the client device 102.

In some embodiments, the client device 102 may include a verifier 118 for verifying the presence of the accessory 124 and/or the identification of the accessory 124. In some embodiments, the verifier 118 may confirm the presence and/or the identity of the accessory 124 to an access system 132 located at an asset hosting site 130. In some embodiments, the verifier 118 may be a plug-in of the media player 104. In some embodiments, the verifier 118 may be an element of the media player 104.

The access system 132 may include code and routines configured to determine, responsive to being executed by the processor 110, whether a single identity identifier, such as the identifier of the accessory 124, is being used to access restricted media via multiple client devices. In some embodiments, the accessory 124 may allow one device, such as the client device 102, to access the restricted media. Alternately or additionally, the accessory 124 may allow a user to authorize a particular number of client devices 102 to access the restricted media. In some embodiments, the restricted media may only be played via the accessory 124.

Thus, for example, a user may purchase the accessory 124 to receive access to special media, such as songs, videos, messages, playlists, etc. not available in some manner to the general public. By way of example, a musical artist may endorse and/or design a model of headphones ("the artist's headphones") that may also allow its purchasers access to exclusive content associated with the artist. For example, the artist's headphones may allow a user to listen to early cuts of songs the artist is working on, mixes of the artist's songs by the artist and/or others, mixes of others' songs mixed by the artist, audio and/or video messages from the artists, songs that the artist likes and/or is currently listening to, playlists curated by the artist, audio and/or video of live performances by the artist, or the like or any combination thereof. In some embodiments, the accessory 124 may allow access to online media associated with the musical artist, such as websites, photos, videos, or the like. For example, the artist's headphones may allow a user to access a website via the client device 102 that allows the user to pre-purchase concert tickets for the artist's tour.

In one embodiment, access to special media is not linked to the accessory 124. For example, the user may purchase access to a special tier of the music service or pay on a per song, per album or per video basis, thereby enabling the user to access enriched content.

Thus, for example, the system 100 may facilitate a connection between an artist and the artist's fans. Alternately or additionally, the system 100 may increase the value of the accessory 124, as the accessory 124 may allow access to otherwise restricted media. Alternately or additionally, the system 100 may increase the value of a music streaming service that works with the accessory 124 to provide the otherwise restricted media. For example, where a user already owns the accessory 124, such as a particular set of headphones, the user may be more likely to sign up for a streaming music service that allows access to the restricted media.

Figure 2:
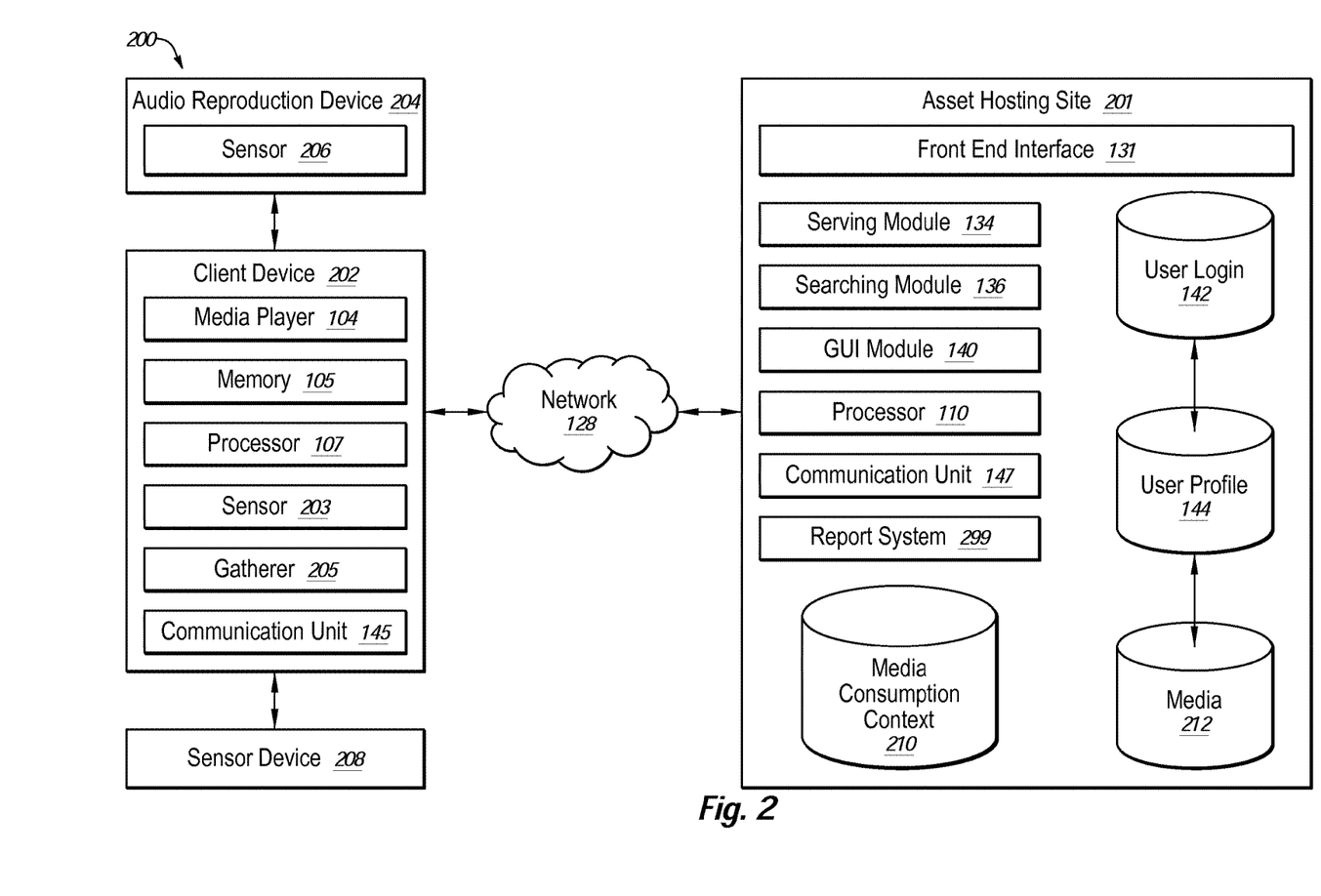
FIG. 2 is a diagram of an example system for collecting information regarding the context related to the consumption of media.

FIG. 2 is a diagram of an example system 200 for collecting information regarding the context related to the consumption of particular media. In some embodiments, some or all of the elements of the system 200 may be combined with some or all of the elements of the system 100 of FIG. 1.

The system 200 may include an asset hosting site 201. The asset hosting site 201 may include a media database 212 generally corresponding to the standard media database 148 and/or the restricted media database 150 of FIG. 1.

In some embodiments, the asset hosting site 201 may include a hardware server configured to provide a media streaming service to one or more client devices 202 communicatively coupled to the network 128.

In some embodiments, the system 200 may collect information regarding the consumption of particular media. For example, the system 200 may collect information about a user and/or the user's environment when the user is listening to particular songs. For example, the system may collect inputs from the user describing one or more of the following: data describing the user's demographic information (age, gender, height, weight, whether the user smokes, income, etc.); the user's musical genre preferences (what genres of music the user likes); the user's musical artist preferences (which musical artists the user likes); the address where the user lives; the address where the user works; the location of one or more parks and other recreation areas within a predefined range of where the user lives or works; the address of the user's gym; the address of the user's favorite park; and information describing the areas where the user habitually runs, walks or exercises.

The system 200 may include a client device 202. The client device 202 may be communicatively coupled to an audio reproduction device 204. Alternately or additionally, the client device 202 may be communicatively coupled to a sensor device 208. The client device 202 and/or the audio reproduction device 204 may include a sensor 203 and/or a sensor 206, respectively. In some embodiments, the audio reproduction device 204 may include headphones, a loudspeaker, etc.

The sensor device 208 may include a smartwatch, smart glasses, an activity tracker such as a fitness-centric wearable, a heart-rate monitor, a GPS receiver, a pedometer and/or other stride-measuring devices, or the like or any combination thereof. As the name indicates, the sensor device 208 may include sensors such as a microphone, an accelerometer, a GPS receiver, a magnetometer, a barometer, a gyroscope, a light sensor, a camera, a pulse oximeter, a galvanic skin response sensor, a heart rate monitor, or the like or any combination thereof. The sensor 203 may include sensors available through the client device 202. For example, the client device 202 may include a microphone, an accelerometer, a GPS receiver, a magnetometer, a barometer, a gyroscope, a light sensor, a camera, or the like or any combination thereof. The sensor 206 may include sensors available through the audio reproduction device 204. For example, the audio reproduction device 204 may include a microphone, an accelerometer, a GPS receiver, a magnetometer, a barometer, a gyroscope, a light sensor, a pulse oximeter, a galvanic skin response sensor, a heart rate monitor, or the like or any combination thereof.

In some embodiments, the client device 202 may include a gatherer 205 configured to collect music consumption context data. The music consumption context data may include, for example, an application identifier, a video identifier, a website identifier, a song identifier and a status identifier. The application identifier may include information for identifying any application the user may access or execute on the client device 202. For example, the application identifier may describe a smartphone application used by the user of the client device 202. The video identifier may include information describing a video that the user views via the client device 202. The videos may be any video, including a music video or a video that includes music in the audio track for the video. The website identifier may include information for identifying any website that the user visits or accesses via the client device 202. The song identifier may include information for identifying a song, such as a song title, a performer name, a song length, an international standard recording code, a music streaming service song identification code and an identity of the music streaming service, a sample of the song audio, or the like or any combination thereof. In some embodiments, the gatherer 205 may determine the song identifier by way of the media player 104. The gather 205 may gather any data necessary to provide the music context report described below with reference to the report system 299.

Alternately or additionally, the audio reproduction device 204 sensor 206 may include a microphone, which may capture a sample of the song for identifying the song via a song-identifying service and/or for creating an acoustic fingerprint that may be used to identify the song against a relevant database. Thus, for example, the gatherer 205 may collect music consumption context data for song plays that originated from the asset hosting site 201 and/or from a source other than the asset hosting site 201. In some embodiments, the gatherer 205 may be a plug-in of the media player 104. In one embodiment, the asset hosting site 201 may include data describing the beats per minute for the song. The microphone may be used to capture the audio delivered to the user, and the gatherer 205 may be used to determine the beats per minute for a song as actually played via the audio reproduction device 204. This data may then be used to confirm or deny whether the beats per minute listed for the song on the asset hosting site 201 is correct. In this way, the beats per minute data for the song may be updated with correct data.

The status identifier may identify a status of the user that occurred as the user listened to the song. The status identifier may include a physiological status and/or a change in a physiological status of the user. For example, the status identifier may include a heart rate, a change in heart rate, a change in electrical conductance of the skin, a respiration rate, a change in respiration rate, or the like or any combination thereof. Alternately or additionally, the status identifier may include an environmental status of the user. For example, the status identifier may include a light level, a location, a date, a time of day, a facility type, an environmental noise level, a temperature, or the like or any combination thereof. Alternately or additionally, the status identifier may include an activity status of the user. For example, the status identifier may indicate whether the user was running, biking, swimming, golfing, skiing, snowboarding, weightlifting, cleaning, or the like or any combination thereof. The status identifier may include information from, and/or may be based on information gathered by, the sensor 203, the sensor 206, the sensor device 208, applications being used on the client device 202, and/or the internet. Alternately or additionally, the status identifier may indicate whether the song is a power song of the user, as described below.

The gatherer 205 may communicate the song identifier and the status identifier to the asset hosting site 201 via the network 128. The song identifier and the status identifier may be stored in a media consumption context database 210. By collecting media consumption context data from multiple gatherers 205 on multiple client devices 202 associated with many users, the gatherer 205 obtains rich data regarding the consumption context of individual songs, groups of songs, genres of songs, and the like. In some embodiments, media consumption context data may be collected in the media consumption context database 210 for only those songs available to a user via the media database 212.

In some embodiments, the music consumption context data may be analyzed for statistically significant correlations, trends, and/or the like. For example, the music consumption context data may be analyzed to determine whether a song and/or portions of a song elicit a physiological response from listeners. Alternately or additionally, the music consumption context data may be analyzed to determine whether particular songs may be more likely to be played during a particular activity. For example, some songs may be played more often by users while running, while other songs may be played more often by the users while biking, hiking, cleaning, weightlifting, and/or performing other activities. Alternately or additionally, the music consumption context data may be analyzed to determine whether particular songs may be more likely to be played in a particular environment. For example, some songs may be played more often in a crowded, noisy subway car than in a relatively quiet outdoor location.

Alternately or additionally, the music consumption context data may be analyzed to determine a relative popularity of a song and whether the song is increasing in popularity, maintaining popularity, or decreasing in popularity. Alternately or additionally, the music consumption context data may be analyzed to determine regional popularity of particular songs. For example, some songs may be popular in different regions of a country. The popularity of a song as determined from the media consumption context database 210 may be more indicative of absolute popularity than play data tracked by the asset hosting site 201, as the media consumption context database 210 may additionally include songs played directly from the client device 202 and/or from other sources.

In some embodiments, members of the music industry, such as artists, agents, marketers, record labels, or the like may be given access to the media consumption context database 210 for analysis of the media consumption context data. Providing those in the music industry with access to the data found in the media consumption context database 210 may encourage the inclusion of media in the media database 212, as the rich media consumption context data may provide valuable insights for writing, remixing, and/or performing songs; creating marketing strategies; planning tours; curating playlists and/or compilations; or the like. Thus, for example, an artist may employ the music consumption context data to understand, in detail, how and/or under what conditions the artist's music is being consumed. Such information may prompt the artist to more prominently incorporate successful elements into new songs, remix songs with a particular activity in mind, change marketing efforts with respect to particular industries or demographics, or the like.

For example, asset hosting site 201 may include a report system 299. The report system 299 may include code and routines configured to analyze the music consumption context data and determine report data describing a music context report. The music context report may describe how one or more different users of different client devices 202 consume different tracks of music. For example, for a given track, the music context report may describe the context for how the track is consumed. The context may describe one or more of the following: an activity engaged in by the user when consuming the track; the environment the user was located in when consuming the track (e.g., time of day, day of week, season of year, user located outside, user located inside, user located at a particular location outside, user located at a particular location inside, etc.); a biological state of the user when consuming the track (e.g., heart rate, activity level, perspiration state, etc.); a psychological status of the user when consuming the track; playlist data describing one or more songs played before the track or one or more songs played after the track; and the buying habits of the users who played the track. In this way, the music context report may provide various data describing how the music is consumed or perceived in the marketplace.

The music context report may be provided to an artist who recorded the track, a user associated with the artist (e.g., the artist's manager) or the record label that distributed the track so that these entities may modify the track or other tracks of the artist based on a desired result in the marketplace. In this way, the report system may provide a service to artists so that they may increase their success or desired results in the marketplace.

The music context report may describe online consumption as well as offline consumption. For example, the music service may enable client devices 202 to download content so that the user may listen to or view the content when the client device 202 is not connected to the network 128. The report system may collect data describing offline and online consumption of content including music or videos.

In some embodiments, the music context report may be analyzed by a processor 110 of the asset hosting site 201. For example, the asset hosting site may include a advertisement module that includes code and routines configured to analyze the music context report and determine advertisements targeted for the user of the client device 202. For example, a music artist may be releasing a new song. The music context report may indicate that the user of the client device 202 has an interest in the song or artist. The advertising module may transmit an advertisement to the client device 202 or account of the user (e.g., email, text message, browser-based advertisement, etc.). Similarly, the music context report may be used to generate advertisements for videos or music discovery.

Figure 3:
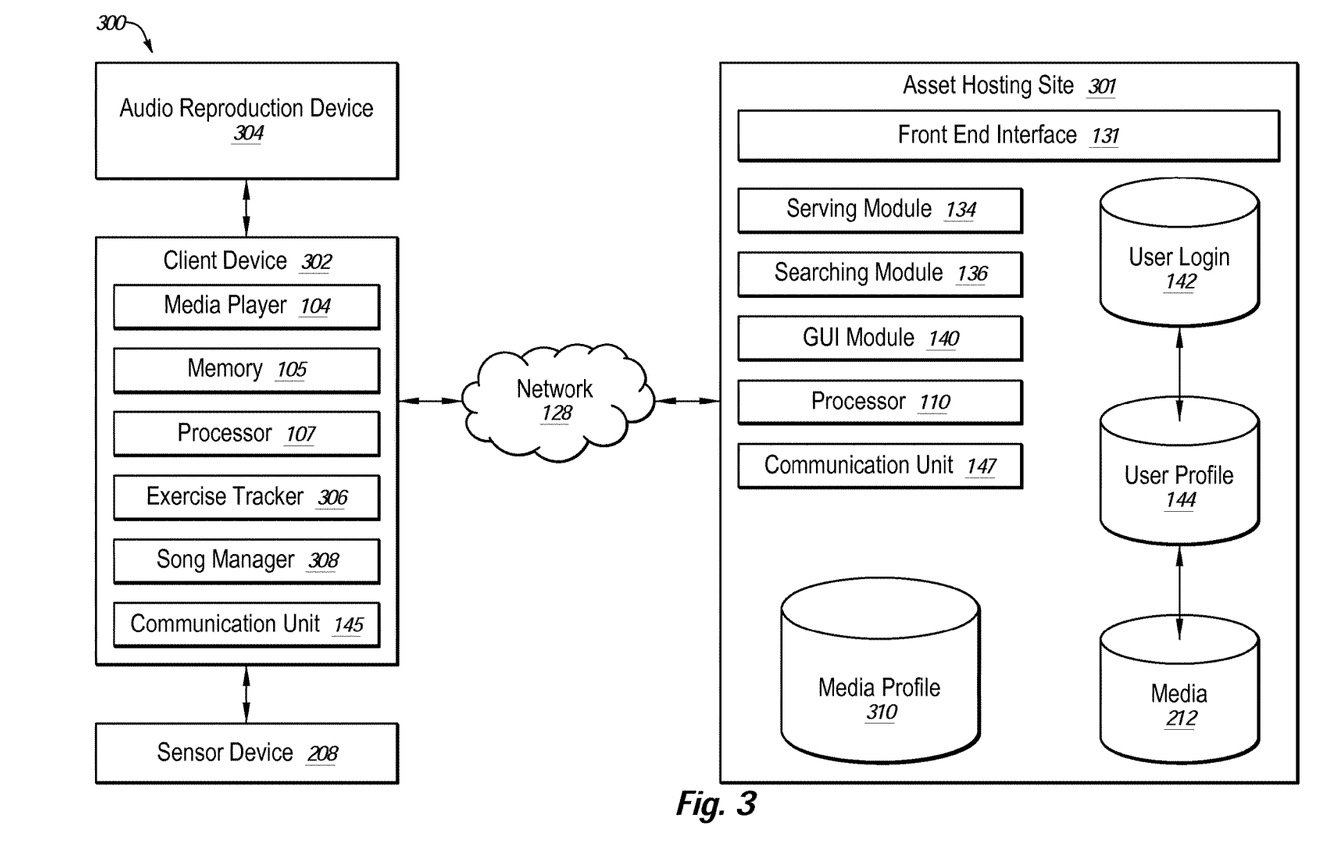
FIG. 3 is a diagram of an example system for delivering a power song to a user during a drag portion of an exercise routine.

FIG. 3 is a diagram of an example system 300 for delivering a power song to a user during a drag portion of an exercise routine. In some embodiments, some or all of the elements of the system 300 may be combined with some or all of the elements of the system 200 of FIG. 2 and/or with some or all of the elements of the system 100 of FIG. 1.

The system 300 may include an asset hosting site 301. The asset hosting site 301 may include a media profile database 310 including information regarding songs included in the media database 212. For example, the media profile database 310 may include information regarding the genre of the songs and/or the elements present in the songs. Alternately or additionally the media profile database 310 may include information regarding the beats per minute (BPM) of the songs. Alternately or additionally, the media profile database 310 may include information regarding song popularity and/or whether a song is trending up in popularity or down in popularity. For example, the media profile database 310 may indicate geographical popularity, whether a song is a candidate to be a breakout song, or the like. Alternately or additionally, the media profile database 310 may include information regarding relationships between songs. For example, the media profile database 310 may indicate that two or more songs may contain similar elements, may be popular among a common group of people, or the like.

The system 300 may include a client device 302. The client device 302 may be communicatively coupled to an audio reproduction device 304. In some embodiments, the audio reproduction device 304 may include headphones, a loudspeaker, etc. The media player 104 may play songs for the user by way of the audio reproduction device 304. The client device 302 may include an exercise tracker 306 and/or a song manager 308. In some embodiments, the exercise tracker 306 and/or the song manager 308 may be a plug-in of the media player 104.

The exercise tracker 306 may analyze an exercise routine of a user to determine drag portions of the exercise routine. The drag portions of the routine may be associated with a portion of the exercise routine that is likely to demand a prolonged period of increased exertion from the user, such as an increased elevation that occurs during a route of an exercise routine. For example, during a biking and/or running exercise routine, a portion of a route of the exercise routine that ascends a relatively steep hill may be a drag portion of the exercise routine. The drag portion may include a relatively long period of moderately elevated exertion, a relatively shorter period of greatly elevated exertion, or the like. In some embodiments, the amounts of time and exertion may be based on observations of the user during exercise routines. Exertion levels observed to cause the user to decrease effort may serve as a baseline for identifying drag portions of exercise routines.

The exercise tracker 306 may include one or more of the following devices alone or communicatively coupled in combination: a fitness tracking device (e.g., FITBIT®, MICROSOFT® Band, GARMIN® Vivo device, MOOV® electronic fitness coach, etc.); a smartwatch including fitness tracking functionality; smart headphones including one or more sensors (e.g., GPS, accelerometer, etc.) for tracking user activity; a heart rate monitor; a GPS-enabled device such as a smartphone executing a fitness tracking application or GPS-enabled watch, etc. In one embodiment, the exercise tracker 306 may include headphones that are communicatively coupled to one or more sensors. For example, the headphones may be communicatively coupled to one or more of the following: a heart rate monitor; a smartphone; a smartwatch; a GPS-enabled device; and a fitness tracking device.

By way of example, the exercise tracker 306 may consider information from a GPS of the client device 302, heart rate information from a sensor device 208 or from a sensor located in the audio reproduction device 304, geographical information from an application on the client device 302 and/or an internet source, or the like in observing an exercise routine of the user. In some embodiments, the exercise tracker 306 may receive information from an exercise application installed on the client device 302 and/or may be a plug-in of such an application. Alternately or additionally, the exercise tracker 306 may monitor a performance metric of the user indicative of the user's effort, such as a heart rate, heart rate variability, pulse oxygenation, a cadence of the user or any other biometric information associated with the user. The exercise tracker 306 may identify drag portions of the exercise routine as they occur. For example, the performance metric of the user may be a target heart rate range for the user to maximize fat burning or to improve cardio. The exercise tracker 306 may identify the drag portion of the exercise routine based on the heart rate falling outside the target heart rate range. Alternately or additionally, the exercise tracker 306 may analyze an exercise routine of the user in advance to identify drag portions of the exercise routine. For example, the exercise tracker 306 may consider a route pre-entered into an exercise application installed on the client device 302. The route may include hills or other inclined areas where the user's performance is likely to decrease because of the increased difficulty of running on an inclined surface. This areas may be identified as drag portions since the user's performance (as indicated by run rate) is likely to decrease or the user's biometric information (such as heart rate, heart rate variability, pulse oxygenation) is likely to increase.

The song manager 308 may instruct the media player 104 to play a user's power song for the user during the drag portion of the exercise routine. A power song may be previously correlated with an increase in user effort. Put another way, a power song may be a song that resonates with the user and, in effect, increases the user's energy, focus, and/or motivation, decreases the user's pain, and/or simply distracts the user from the exercise routine during its drag portions. The power songs may be held in reserve for the drag portions of the exercise routine.

In some embodiments, the song manager 308 may instruct the media player 104 to play test songs for the user during non-drag portions of the exercise routine to analyze a performance metric of the user while the test song is playing to determine whether to classify the test song as one of the power songs associated with the user. For example, if a user's effort increases in response to a test song being played (as indicated, for example, by the user's heart rate, heart rate variability, pulse oxygenation, change in activity such as running faster indicated by GPS or accelerometer data), the test song may be classified as one of the power songs associated with the user. The test songs may be selected based on similarities to other power songs associated with the user. In some embodiments, members of the music industry may pay to give a particular song or songs priority as a test song.

In some embodiments, the song manager 308 determines power songs using a seed song. For example, the song manager 308 may instruct the media player 104 to play a seed song. The song manager 308 determines a reaction from the user to the seed song. For example, if the user increases exertion, the song manager 308 may classify the seed song as a power song. The song manager 308 may identify similar songs to the seed song and classify the similar songs as power songs. For example, the song manager 308 may identify songs as being similar based on a similar tempo, beats per minute, a similar change in sound level between the bridge and the chorus, etc.

In some embodiments, the song manager 308 may determine power songs based on beats per minute corresponding to target steps per minute. For example, where a user wants to run six miles an hour, the song manager 308 determines that six miles an hour corresponds to target steps per minute of 100 steps per minute. The song manager 308 may determine that for a particular user, 150 beats per minute substantially corresponds to 100 steps per minute. The song manager 308 may classify a new song with 150 beats per minute as a power song.

In some embodiments, a glide portion of the user's exercise routine may be identified in the analysis of the user's exercise routine. The glide portion of the routine may be associated with a portion of the exercise routine that is likely to demand a prolonged period of decreased exertion from the user (as indicated, for example, by the user's heart rate, heart rate variability, pulse oxygenation, change in activity such as running slower indicated by GPS or accelerometer data). For example, during a biking and/or running exercise routine, a portion of the route of the exercise routine that descends gradually may be a glide portion of the exercise routine. Put another way, glide portions of an exercise routine may include the least painful, the least exhausting, and/or the most satisfying portions of the exercise routine.

In some embodiments, the song manager 308 may instruct the media player 104 to play a glide song for the user during a glide portion of the exercise routine identified by the exercise tracker 306. Thus, for example, the user may be conditioned to respond to the glide song in the same manner as a power song, as the user may develop a positive association with the glide song. In some embodiments, a glide song may be played during multiple glide portions in an attempt to condition the user. Alternately or additionally, the glide song may be tested to determine whether to classify the glide song as a power song. In some embodiments, members of the music industry may pay to give a particular song or songs priority as a seed song.

The effectiveness of the power songs may be monitored. The song manager 308 may analyze a performance metric of the user while the power song is playing to determine whether to declassify the power song. For example, the song manager 308 may determine that the power song no longer encourages the user to increase effort. Thus, for example, as the tastes of the user change, the power songs associated with the user may change to reflect the change in the user's tastes. Put another way, as the user tires of familiar songs and discovers new songs, the seed songs and test songs may be used to keep the power songs associated with the user relatively fresh and effective.

Alternately or additionally, the seed songs and/or test songs may be identified based on songs played by the user while the user is not exercising, on songs currently and/or previously associated with the user, on popular songs and/or songs trending up in popularity, on songs that are classified as power songs for other users with similar musical tastes, and/or on song information available via the media profile database 310.

In some embodiments, one or more of the exercise tracker 306 and the song manager 308 may be stored and executed by the asset hosting site 301. In some embodiments, some or all of the functionality of one or more of the exercise tracker 306 and the song manager 308 may be provided by one or more elements of the asset hosting site 301.

Example Method

Figure 4:
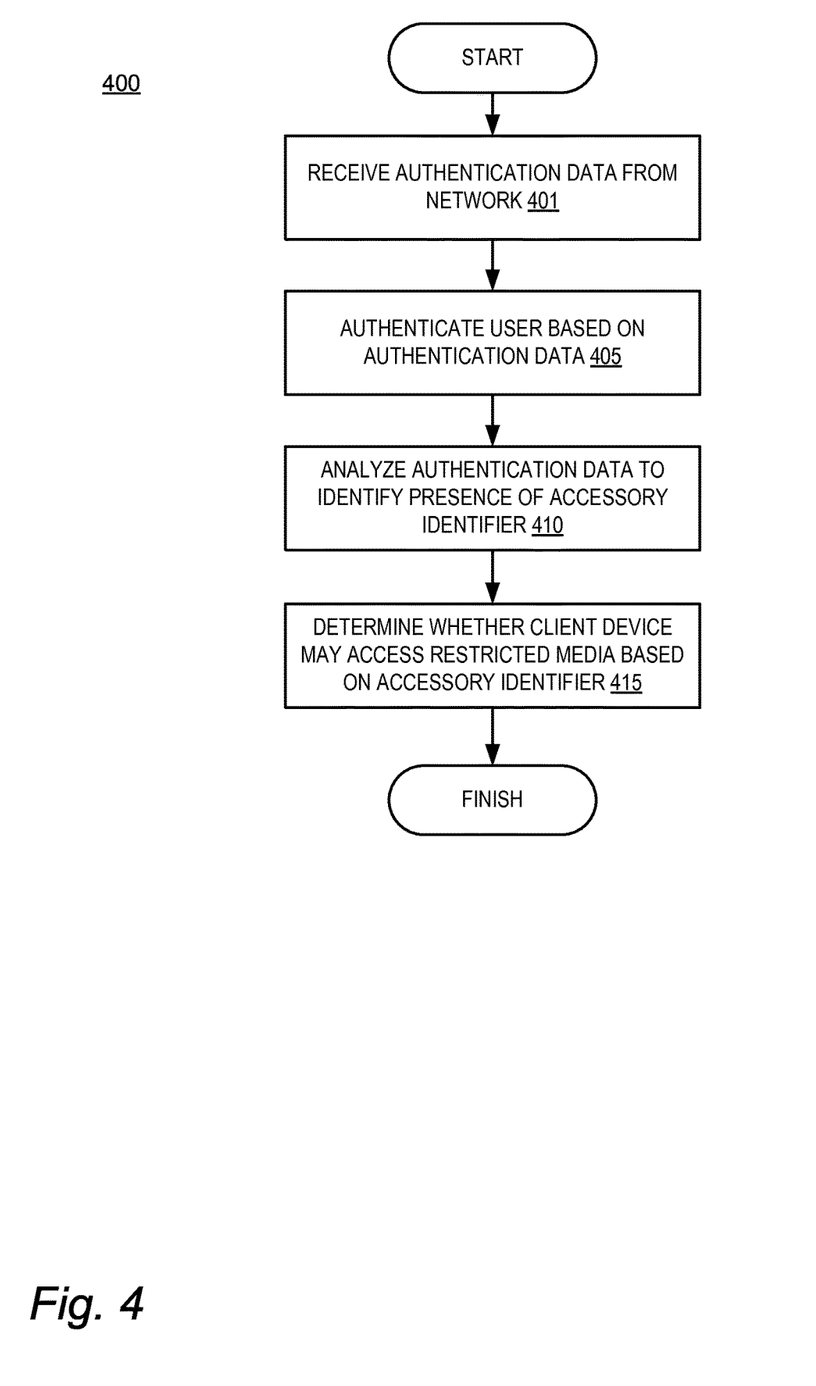
FIG. 4 is a diagram of an example method for allowing distribution of restricted media to users based on the presence of a selected accessory.

Turning now to FIG. 4, depicted is a diagram of an example method 400 for allowing distribution of restricted media to users based on the presence of a particular accessory. In one embodiment, the access system 132 may include code and routines configured to perform one or more blocks of the method 400 responsive to being executed by the processor 110. At block 401, the access system 132 may receive the authentication data from the network 128. At block 405, the access system 132 may authenticate the user of the client device 102 based on the user name and password included in the authentication data. At block 410, the access system 132 may analyze the authentication data to identify the presence of an accessory identifier. At block 415, the access system 132 may determine whether the client device 102 may access restricted media 150 based on the accessory identifier.

Figure 5:
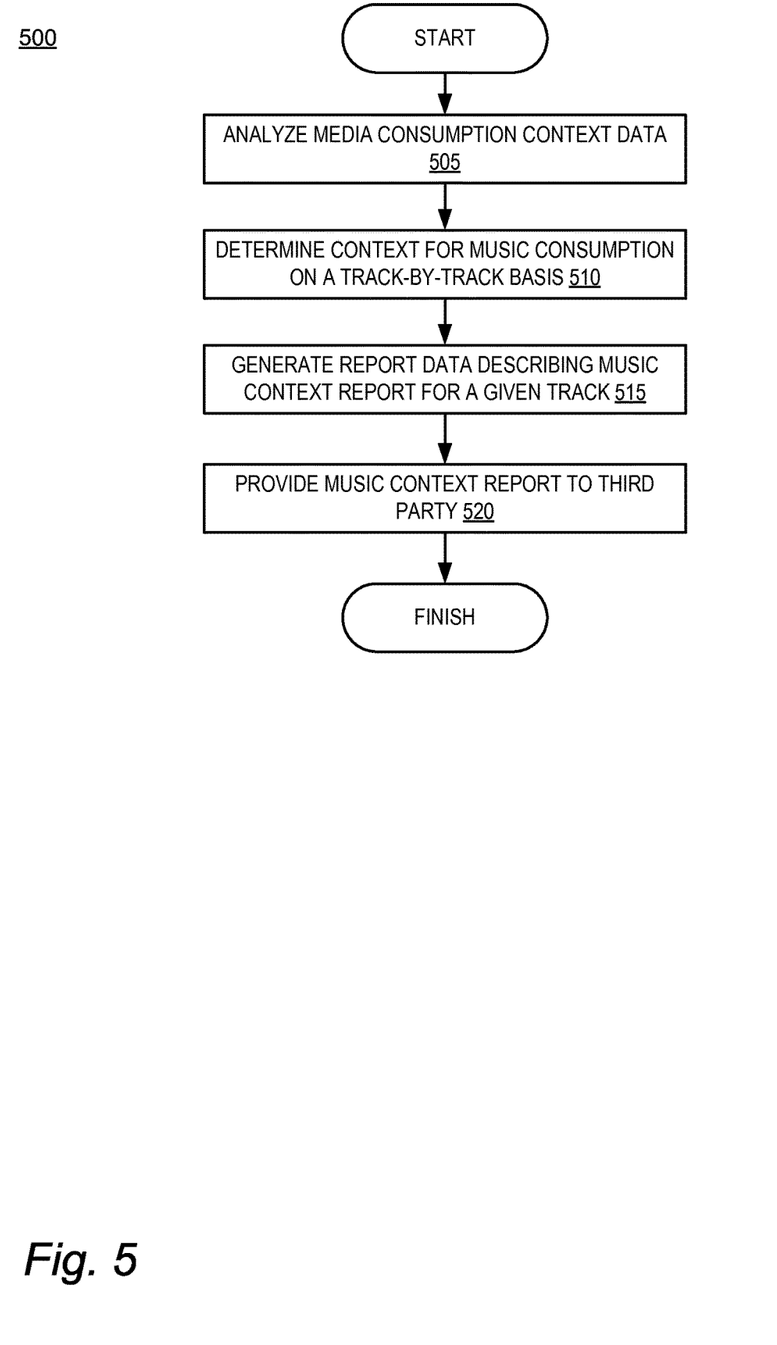
FIG. 5 is a diagram of an example method for generating and providing a music context report to a third party.

Turning now to FIG. 5, depicted is a diagram of an example method 500 for generating and providing a music context report to a third party. The third party may be the artist of a song, the artist's agent, the artist's record label, an advertiser or any other third party. In one embodiment, the report system 299 may include code and routines configured to perform one or more blocks of the method 500 responsive to being executed by the processor 110. At block 505, the report system 299 may analyze media consumption context data. At block 510, the report system 299 may determine the context for how one or more users are consuming media on a track-by-track basis. At block 515, the report system 299 may generate report data describing a music context report for a given track. At block 520, the report system 299 may provide the music context report to the third party.

Figure 6:
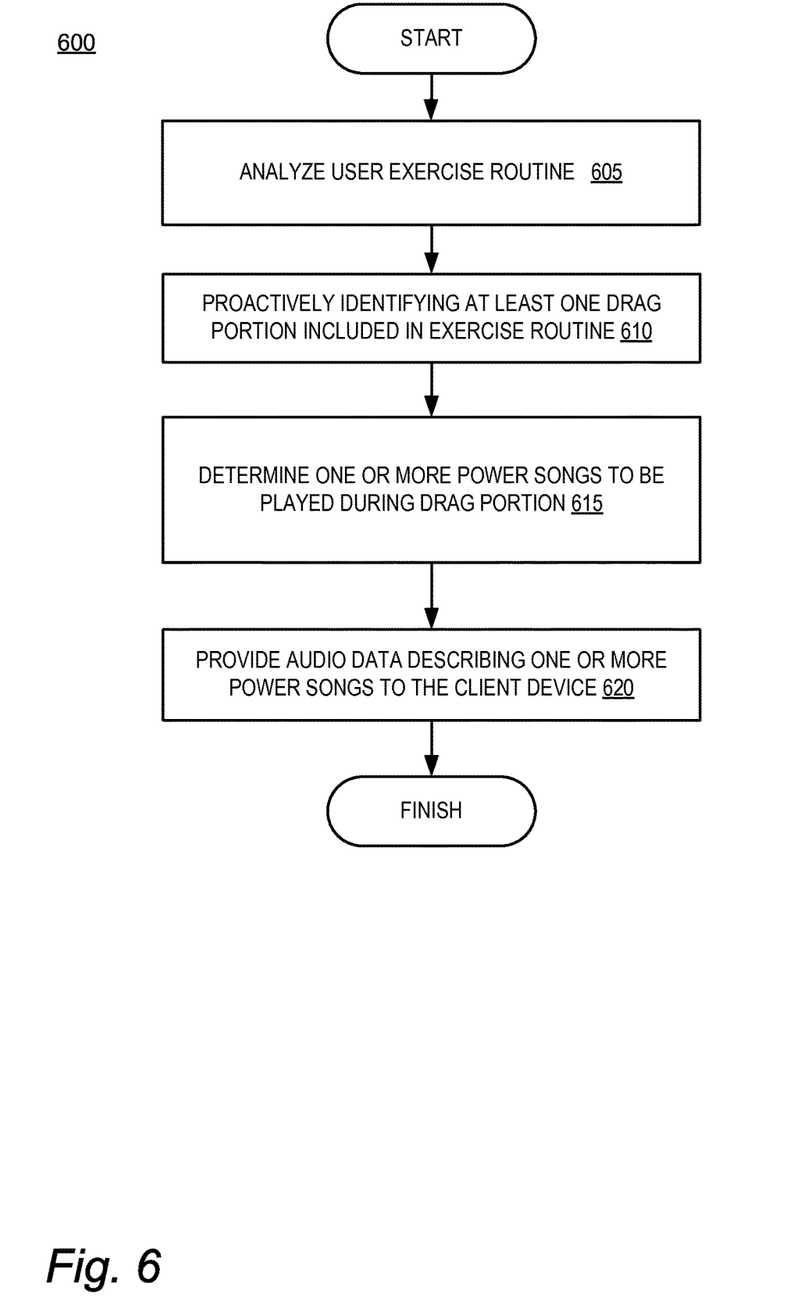
FIG. 6 is a diagram of an example method for delivering a power song to a user during a drag portion of an exercise routine.

FIG. 6 is a diagram of an example method 600 for delivering a power song to a user during a drag portion of an exercise routine. In one embodiment, one or more of the exercise tracker 306 and song manager 308 may include code and routines configured to perform one or more blocks of the method 600 responsive to being executed by the processor 110 or the processor 107. At block 605, the exercise tracker 306 may analyze the user's exercise routine (as used herein, the term "exercise routine may refer to any routine associated with the user which may include consumption of media content such as music). At block 610, the exercise tracker 306 may proactively identify at least one drag portion included in the exercise routine. At block 615, the song manager 308 may determine one or more power songs to be played during the drag portion. At block 620, the song manager 308 may provide audio data describing one or more power songs.

Figure 7:
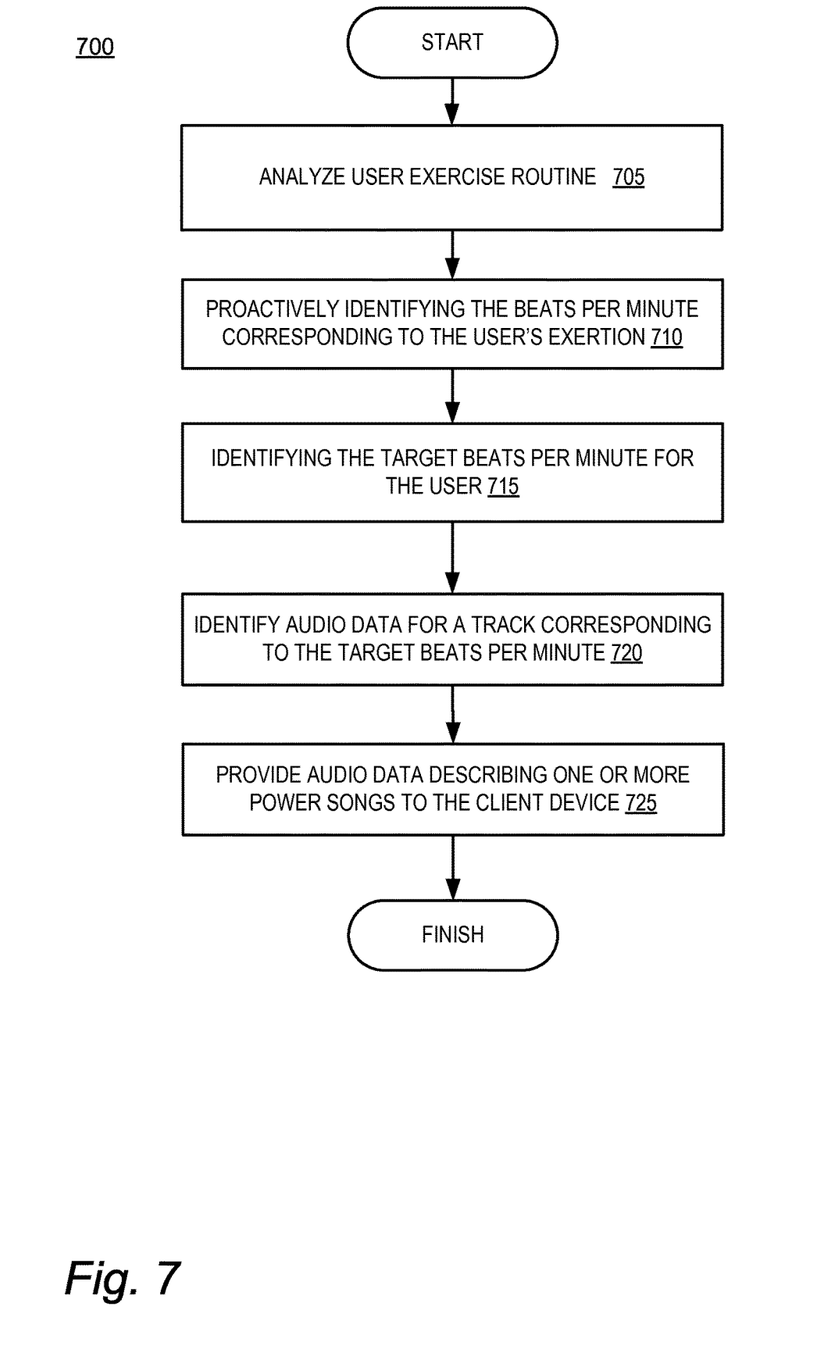
FIG. 7 is a diagram of an example method for delivering a power song which is configured to cause the user to meet a target exertion level.

FIG. 7 is a diagram of an example method 700 for delivering a power song which is configured to cause the user to meet a target exertion level. In one embodiment, one or more of the exercise tracker 306 and song manager 308 may include code and routines configured to perform one or more blocks of the method 700 responsive to being executed by the processor 110 or the processor 107. At block 705, the exercise tracker 306 may analyze the user's exercise routine. At block 710, the exercise tracker 306 may proactively identify at least the beats per minute corresponding to the user's current level of exertion. The user may have a target beats per minute corresponding to the user's desired exercise pace (e.g., running pace) or some other goal or target (heart rate, calorie burn, etc.). At block 715, the exercise tracker 306 may identify the target beats per minute for the user. At block 720, the song manager 308 may identify audio data for one or more tracks corresponding to the target beats per minute. For example, the identified song may be a song whose beats per minute is determined to result in the user achieving their goal or target. This song may be an example of a power song. At block 725, the song manager 308 may provide audio data describing one or more power songs.

The implementations of the specification can also relate to an apparatus for performing the operations described herein. This apparatus may be specially constructed for the required purposes, or it may include a special-purpose computer selectively activated or reconfigured by a computer program stored in the computer. Such a computer program may be stored in a non-transitory computer-readable storage medium, including, but is not limited to, any type of disk including floppy disks, optical disks, compact disc read-only memories (CD-ROMs), and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory, or any type of media suitable for storing electronic instructions, each coupled to a computer system bus.

The specification can take the form of some entirely hardware implementations, some entirely software implementations, or some implementations containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those that practice the art of computer programming. Additionally, the disclosure is in no way limited to implementations in any specific programming language, or for any specific operating system or environment. Accordingly, the disclosure is intended to be illustrative, but not limiting, of the scope of the specification, which is set forth in the following claims.

What is claimed is:

1. A system for authorizing access to restricted media, the system comprising:
   a communication unit configured to communicate with a client device via a network;
   a non-transitory storage medium storing media assets including standard media and restricted media, the restricted media being different from the standard media; and
   an access system configured to receive at least one of a brand, make, model, and serial number of an accessory operatively coupled to the client device via the network, the accessory configured to provide at least audio playback of media provided to the client device;
   wherein the access system includes instructions that, responsive to being executed by a processor:
      analyze the at least one of the brand, make, model, and serial number of the accessory operatively coupled to the client device to determine if the client device is authorized to access the restricted media;
      authorize the client device to access the standard media regardless of whether the at least one of the brand, make, model, and serial number indicates that the accessory communicatively coupled to the client device is one of a set of brands, makes, models, or serial numbers of accessories authorized to access the restricted media;
      deny the client device access to the restricted media based solely on the at least one of the brand, make, model, and serial number indicating that the accessory communicatively coupled to the client device is not one of a set of brands, makes, models, or serial numbers of accessories authorized to access the restricted media; and
      authorize the client device to access the restricted media based solely on the at least one of the brand, make, model, and serial number indicating that the accessory communicatively coupled to the client device is one of the set of brands, makes, models, or serial numbers of accessories authorized to access the restricted media.

2. The system of claim 1, wherein the accessory is a pair of headphones.

3. The system of claim 1, wherein the accessory is a speaker.

4. The system of claim 1, wherein the restricted media includes a restricted song not included in the standard media.

5. The system of claim 4, wherein the restricted song is associated with the accessory.

6. The system of claim 4, wherein the restricted song is a different version of a standard song included in the standard media.

7. An asset hosting site comprising:
   a communication unit to communicate with a client device via a network;
   a non-transitory storage medium to store media assets including standard media and restricted media, the restricted media being different from the standard media; and
   an access system to:
      receive at least one of a brand, make, model, and serial number of an accessory operatively coupled to the client device via the network, the accessory configured to provide at least audio playback of media provided to the client device;
      analyze solely the at least one of the brand, make, model, and serial number of the accessory operatively coupled to the client device to determine if the client device is authorized to access the restricted media;
      authorize the client device to access the restricted media when the at least one of the brand, make, model, and serial number of the accessory operatively coupled to the client device indicates that the accessory associated with the client device is one of a set of brands, makes, models, or serial numbers of accessories authorized to access the restricted media; and
      deny the client device access to the restricted media when the at least one of the brand, make, model, and serial number of the accessory operatively coupled to the client device indicates that the accessory associated with the client device is not one of the set of brands, makes, models, or serial numbers of accessories authorized to access the restricted media; and
   a serving module to provide the standard media to the authorized client via the network regardless of whether the at least one of the brand, make, model, and serial number of the accessory operatively coupled to the client device indicates that the accessory associated with the client device is not one of the set of brands, makes, models, or serial numbers of accessories authorized to access the restricted media, to provide the restricted media to the client device via the network in response to the client device being authorized to access the restricted media by the access system, and to deny the restricted media to the client device via the network in response to the client device being unauthorized to access the restricted media by the media access system.

8. The asset hosting site of claim 7, wherein the accessory is a pair of headphones.

9. The asset hosting site of claim 7, wherein the accessory is a speaker.

10. The asset hosting site of claim 7, wherein the restricted media includes a restricted song not included in the standard media.

11. The asset hosting site of claim 10, wherein the restricted song is associated with the accessory.

12. The asset hosting site of claim 10, wherein the restricted song is a different version of a standard song included in the standard media.

13. An asset hosting site comprising:
a front end interface to communicate with a client device via a network, the client device including a media player for playing media assets from the asset hosting site via the network, the client device communicatively coupled to an accessory configured to provide at least audio playback of media provided to the client device;
a non-transitory storage medium to store the media assets, the media assets including standard media and restricted media, the restricted media being different from the standard media; and
an access system to:
log the client device in to the asset hosting site and, in response to the client device being logged in to the asset hosting site, granting the client device access to the standard media; and
receive at least one of a brand, make, model, and serial number of the accessory communicatively coupled to the client device, and solely in response to the at least one of the brand, make, model, and serial number indicating that the client device is authorized to access the restricted media, granting the client device access to the restricted media,
wherein access is granted to the standard media without the at least one of the brand, make, model, and serial number of the accessory communicatively coupled to the client device indicating that the client device is authorized to access the restricted media and access is not granted to the restricted media without the at least one of the brand, make, model, and serial number of the accessory communicatively coupled to the client device indicating that the client device is authorized to access the restricted media.

14. The asset hosting site of claim 13, wherein the accessory is a pair of headphones.

15. The asset hosting site of claim 13, wherein the accessory is a speaker.

16. The asset hosting site of claim 13, wherein the restricted media includes a restricted song not included in the standard media.

17. The asset hosting site of claim 16, wherein the restricted song is associated with the accessory.

18. The asset hosting site of claim 16, wherein the restricted song is a different version of a standard song included in the standard media.

* * * * *